June 27, 1933.    J. KUBLER    1,916,161
RECTIFYING SYSTEM
Filed Dec. 23, 1931

Inventor
J. Kubler
by G. J. D Elvin
Attorney

Patented June 27, 1933

1,916,161

UNITED STATES PATENT OFFICE

JOHANNES KÜBLER, OF BADEN, SWITZERLAND, ASSIGNOR TO AKTIENGESELLSCHAFT BROWN BOVERI & CIE., OF BADEN, SWITZERLAND, A JOINT STOCK COMPANY OF SWITZERLAND

RECTIFYING SYSTEM

Application filed December 23, 1931, Serial No. 582,756, and in Germany December 22, 1930.

This invention relates to improvements in electric current rectifying systems and particularly to a rectifying system employing a rectifier of the metallic vapor type in which transformers supplying the anodes of the rectifier are so arranged and connected as to permit a plurality of anodes to be operated in parallel.

When a plurality of the anodes of an electric current rectifier of the metallic vapor arcing type are to be operated in parallel from different phases of a supply transformer common to all of the anodes, means must be provided to secure uniformity of the potential impressed upon the anodes to be operated in parallel. The secondary windings of a transformer supplying a six phase rectifier were heretofore divided into two three phase systems each connected in star to form a neutral point for the windings of each system and the neutral points of the windings were interconnected by an interphase transformer to secure the necessary equality of potential impressed on the anodes to be operated in parallel, the negative bus bar of the direct current circuit then being connected with the mid point of the interphase transformer. Such arrangement is not, however, uniformly effective to secure equality of potential on the anodes to be operated in parallel even when only two anodes are to be operated in parallel and will not secure the desired result when more than two anodes are to be operated at the same time.

It is therefore among the objects of the present invention to provide an electric current rectifying system in which the windings of the transformer connecting a source of alternating current supply with an electric current rectifier of the metallic vapor arcing type are so arranged and connected that a uniform potential may be impressed simultaneously on a number of anodes of the rectifier to be operated, in parallel.

Another object of the invention is to provide an electric current rectifying system in which the transformers are so arranged in connection with a source of alternating current supply and an electric current rectifier of the metallic vapor arcing type having a plurality of anodes, that substantially equal potential is simultaneously impressed on three of the anodes for causing the operation of such anodes in parallel.

Figure 1:
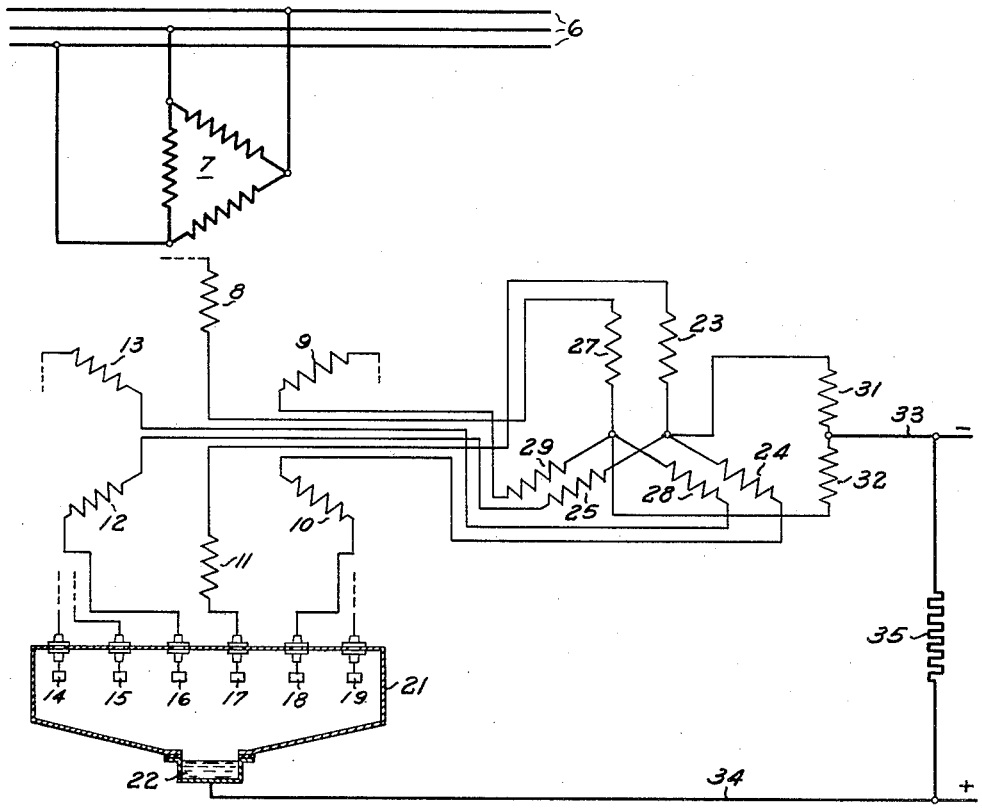
Figure 2:
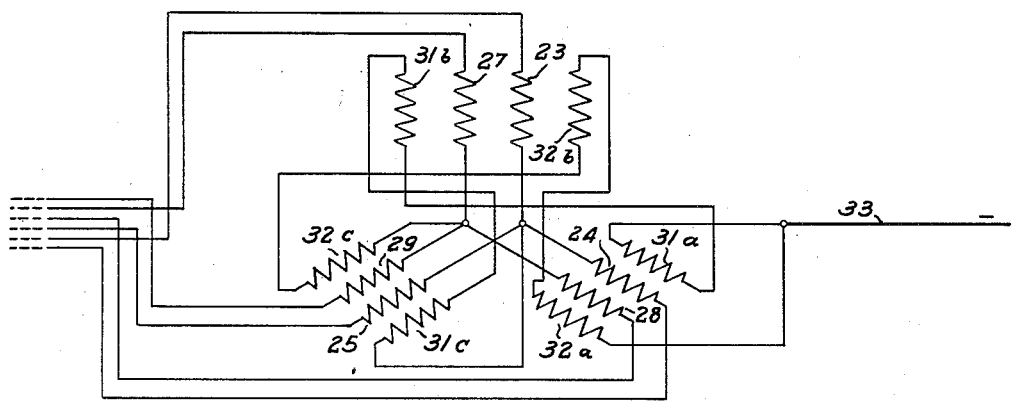

Objects and advantages other than those above set forth will be apparent from the following description when read in connection with the accompanying drawing in which:

Fig. 1 diagrammatically illustrates the arrangement and connections of a transformer connecting an electric current rectifier of the metallic vapor arcing type with a source of alternating current, and the arrangement and connections of a plurality of interphase transformers with the supply transformer and the rectifier whereby substantially equal potential is simultaneously impressed on a plurality of anodes of a rectifier to be operated in parallel, and Fig. 2 diagrammatically illustrates a modified embodiment of the interphase transformers of the system of Fig. 1 in which the arrangements and connections thereof are shown when the windings of each of the interphase transformers are arranged on the same core.

Referring more particularly to the drawing by characters of reference, the reference number 6 designates an alternating current supply line having the primary windings 7 of a supply transformer connected therewith. The secondary winding of the supply transformer is divided into a plurality of phase sections 8, 9, 10, 11, 12 and 13, each connected at one end thereof with one of a plurality of anodes 14, 15, 16, 17, 18 and 19 arranged within a tank 21 having a pool of vaporizable material 22, such as mercury, therein forming a cathode; the anodes, the tank and the cathode together forming an electric current rectifier structure of the metallic vapor arcing type. The other end of each of the phases of the secondary winding of the supply transformer is connected with one winding of a polyphase interphase transformer having the windings divided into two groups of three windings each connected in star. Thus windings 23, 24 and 25 form one group and windings 27, 28 and 29 form the other group of the interphase transformer windings. The neutral points of the two groups of windings are interconnected by a single phase interphase transformer substantially divided into two windings 31 and 38 by reason of connection with the single phase interphase transformer, at the mid point of the windings thereof, of a conductor 33 forming the negative bus bar of a direct current output circuit for the rectifier, of which the positive bus bar 34 is a conductor connected with the cathode 22. The direct current circuit supplies a load which, for the purpose of illustration, is shown in the drawing as a resistance 35. As indicated in the drawing, one winding of each group of the polyphase interphase transformer windings is arranged on the same leg of a three legged core and that such windings are each displaced in phase from the supply transformer secondary windings to which they are connected by 180°. As indicated in Fig. 1, both windings of the single phase interphase transformer are arranged on a core separate from the polyphase interphase transformer. With the connection of the supply transformer secondary windings and the interphase transformers as shown in the drawing it is possible to supply substantially equal potential to any group of three anodes as shown at 16, 17 and 19 so that such group of anodes may be operated in parallel which would not be the case if equal potential were not impressed on each such anodes.

Fig. 2 indicates the arrangement of the windings of both interphase transformers on a common three legged core. In this embodiment of the invention one winding of the single phase interphase transformer is divided into three portions 31a, 31b and 31c and the other winding is divided into three portions 32a, 32b and 32c. Each of the groups of three portions of the windings of the single phase interphase transformer is connected in zigzag connection and is so arranged that a portion of each of the windings is located on the same core leg with one winding of each of the groups of windings of the polyphase interphase transformer. The two interphase transformers are thus combined into a single unit with a common magnetic circuit for both transformers which materially decreases the cost and the space required for the transformers. The negative direct current bus bar 33 is connected with one terminal of each of the single phase interphase transformer winding portions 31a and 32a.

In any of the above arrangements of a supply transformer secondary winding and interphase transformers in connection with an electric current rectifier of the metallic vapor arc type, the same result is obtained, i. e., equality of potential impressed on three anodes which permits operation of such anodes in parallel.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric current rectifying system, a source of alternating current supply, an electric current rectifier of the metallic vapor arcing type having a plurality of anodes, a transformer connecting said source of alternating current supply with the anodes of said rectifier, a polyphase interphase transformer connected with the secondary windings of said supply transformer, and a single phase interphase transformer connected with said polyphase interphase transformer, said interphase transformers cooperating with said supply transformer to cause potentials of substantially equal value to be simultaneously impressed upon a plurality of the anodes of said rectifier to effect simultaneous operation thereof.

2. In an electric current rectifying system, a source of alternating current supply, an electric current rectifier of the metallic vapor arcing type having a plurality of anodes, a supply transformer connecting said source of alternating current supply with the anodes of said rectifier, a polyphase interphase transformer having a plurality of windings connected with the secondary windings of said supply transformer, the windings of said interphase transformer being connected into groups each having a neutral point, and a single phase interphase transformer connected with the neutral points of said polyphase interphase transformer, said interphase transformers cooperating with said supply transformer to cause potentials of substantially equal value to be simultaneously impressed upon a plurality of the anodes to effect simultaneous operation thereof.

3. In an electric current rectifying system, a source of alternating current supply, an electric current rectifier of the metallic vapor arcing type having a plurality of anodes, a supply transformer connecting said source of alternating current supply with the said anodes of said rectifier, a polyphase interphase transformer comprising a plurality of windings connected with the secondary windings of said supply transformer, the windings of said interphase transformer being connected into groups each having a neutral point and having one winding of each group arranged on one leg of a multi-legged core, and a single phase interphase transformer having a plurality of windings connected with the neutral points of said polyphase interphase transformer, the windings of said single phase interphase transformer being arranged upon the core of said polyphase interphase transformer, said interphase transformers cooperating with said supply transformer to cause potentials of substantially equal value to be simultaneously impressed upon a plurality of the anodes to effect simultaneous operation thereof.

4. In an electric current rectifying system, a source of alternating current supply, an electric current rectifier of the metallic vapor arcing type having a plurality of anodes, a supply transformer having primary and secondary windings connecting said source of alternating current supply with the anodes of said rectifier, a polyphase interphase transformer having windings connected with the secondary windings of said supply transformer, the windings of said polyphase interphase transformer being connected into groups and having one winding of each group arranged on one leg of a multi-legged core, and a single phase interphase transformer having windings connected with said polyphase interphase transformer, the windings of said single phase interphase transformer being divided into a plurality of portions, one of the portions of each winding of said single phase interphase transformer being arranged upon a different leg of the core of said polyphase interphase transformer, said interphase transformers and said supply transformer cooperating to cause potentials of substantially equal value to be simultaneously impressed upon a plurality of the anodes to effect simultaneous operation thereof.

5. In an electric current rectifying system, a source of alternating current supply, an electric current rectifier of the metallic vapor arcing type having a plurality of anodes, a supply transformer comprising a primary winding and a plurality of secondary windings connecting said source of alternating current supply with the anodes of said rectifier, a polyphase interphase transformer having a plurality of windings connected with the secondary winding of said supply transformer, and a single phase interphase transformer having windings connected with the windings of said polyphase interphase transformer, the windings of one of said interphase transformers being connected between the secondary windings of said supply transformer and both of said interphase transformers cooperating with said supply transformer to cause potentials of substantially equal value to be simultaneously impressed upon a plurality of the anodes to effect simultaneous operation thereof.

6. In an electric current rectifying system, a source of alternating current supply, an electric current rectifier of the metallic vapor arcing type having a plurality of anodes, a supply transformer comprising primary and secondary windings connecting said alternating source with the anodes of said rectifier, a direct current circuit supplied by said rectifier, a polyphase interphase transformer having windings connected with the secondary winding of said supply transformer, and a single phase interphase transformer having windings connected with the said windings of the polyphase interphase transformer, the windings of one of said interphase transformers being connected between the secondary windings of said supply transformer and the said windings of the other of said interphase transformers being connected with the secondary winding of said supply transformer and forming a portion of said direct current circuit, said transformers cooperating to cause potentials of substantially equal value to be simultaneously impressed upon a plurality of the anodes to effect simultaneous operation thereof.

In testimony whereof I have hereunto subscribed my name this 7th day of December A. D. 1931.

JOHANNES KÜBLER.